US010970190B2

(12) United States Patent
Kamran et al.

(10) Patent No.: US 10,970,190 B2
(45) Date of Patent: Apr. 6, 2021

(54) HYBRID LOG VIEWER WITH THIN MEMORY USAGE

(71) Applicant: EMC IP Holding Company LLC, Hopkinton, MA (US)

(72) Inventors: Lior Kamran, Rishon LeZion (IL); Amir Kredi, Raanana (IL); Amir Miron, Rishon Letzion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 316 days.

(21) Appl. No.: 16/162,497

(22) Filed: Oct. 17, 2018

(65) Prior Publication Data
US 2020/0125473 A1  Apr. 23, 2020

(51) Int. Cl.
*G06F 11/34* (2006.01)
*G06F 11/30* (2006.01)

(52) U.S. Cl.
CPC ...... *G06F 11/3476* (2013.01); *G06F 11/3072* (2013.01); *G06F 11/3495* (2013.01); *G06F 2201/835* (2013.01); *G06F 2201/86* (2013.01)

(58) Field of Classification Search
CPC ............. G06F 11/3476; G06F 11/3495; G06F 11/3072; G06F 2201/86; G06F 2201/835; G06F 17/40; G06F 11/1471; G06F 11/2094; G06F 11/2097
See application file for complete search history.

(56) References Cited

U.S. PATENT DOCUMENTS

| 5,847,972 A * | 12/1998 | Eick ...................... G06F 11/323 709/246 |
| 10,698,756 B1 * | 6/2020 | Abdelsalam ........ G06F 11/3006 |
| 2013/0268839 A1 * | 10/2013 | Lefebvre .............. G06Q 10/107 715/234 |
| 2014/0359375 A1 * | 12/2014 | Longobardi ........ G06F 11/3476 714/45 |

* cited by examiner

Primary Examiner — Mischita L Henson
(74) Attorney, Agent, or Firm — Daly, Crowley, Mofford & Durkee, LLP

(57) ABSTRACT

A method is disclosed, comprising: storing, in a memory of a first computing device, a log filter list that identifiers a plurality of log filters, each of the plurality of log filters being executed on a respective one of a plurality of nodes in a distributed computing system; removing a first log message from a data structure that is stored in the memory of the first computing device, the first log message being obtained by the first computing device from a first one of the plurality of log filters that is associated with a first log source; detecting whether the first log message includes a placeholder message that is generated by the first log filter while the first log source is in a paused state; and selecting the first log message for further processing, when the first log message does not include a placeholder message.

20 Claims, 10 Drawing Sheets

HYBRID LOG VIEWER WITH THIN MEMORY USAGE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method is provided for collecting log data in a distributed computing system, comprising: storing, in a memory of a first computing device, a log filter list that identifiers a plurality of log filters, each of the plurality of log filters being executed on a respective one of a plurality of nodes in the distributed computing system; removing a first log message from a data structure that is stored in the memory of the first computing device, the first log message being obtained by the first computing device from a first one of the plurality of log filters that is associated with a first log source, the first log message being removed from the data structure based on having a least recent timestamp among a plurality of log messages that are stored in the data structure; detecting whether the first log message includes a placeholder message that is generated by the first log filter while the first log source is in a paused state; discarding the first log message, when the first log message includes a placeholder message; and selecting the first log message for further processing, when the first log message does not include a placeholder message.

According to aspects of the disclosure, a system is provided comprising: a memory; and at least one processor operatively coupled to the memory, the at least one processor being configured to: store, in the memory, a log filter list that identifiers a plurality of log filters, each of the plurality of log filters being executed on a respective one of a plurality of nodes in a distributed computing system; remove a first log message from a data structure that is stored in the memory, the first log message being obtained from a first one of the plurality of log filters that is associated with a first log source, the first log message being removed from the data structure based on having a least recent timestamp among a plurality of log messages that are stored in the data structure; detect whether the first log message includes a placeholder message that is generated by the first log filter while the first log source is in a paused state; discard the first log message, when the first log message includes a placeholder message; and select the first log message for further processing, when the first log message does not include a placeholder message.

According to aspects of the disclosure, a non-transitory computer-readable medium configured to store one or more processor-executable instructions, which when executed by at least one processor cause the at least one processor to perform the operations of: storing, in a memory that is operatively coupled to the at least one processor, a log filter list that identifiers a plurality of log filters, each of the plurality of log filters being executed on a respective one of a plurality of nodes in a distributed computing system; removing a first log message from a data structure that is stored in the memory, the first log message being obtained from a first one of the plurality of log filters that is associated with a first log source, the first log message being removed from the data structure based on having a least recent timestamp among a plurality of log messages that are stored in the data structure; detecting whether the first log message includes a placeholder message that is generated by the first log filter while the first log source is in a paused state; discarding the first log message, when the first log message includes a placeholder message; and selecting the first log message for further processing, when the first log message does not include a placeholder message.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to he protected herein, some terms are explained. In some embodiments, the term "I/O request" or simply "I/O" may be used to refer to an input or output request. In some embodiments, an I/O request may refer to a data read or write request.

Figure 1:
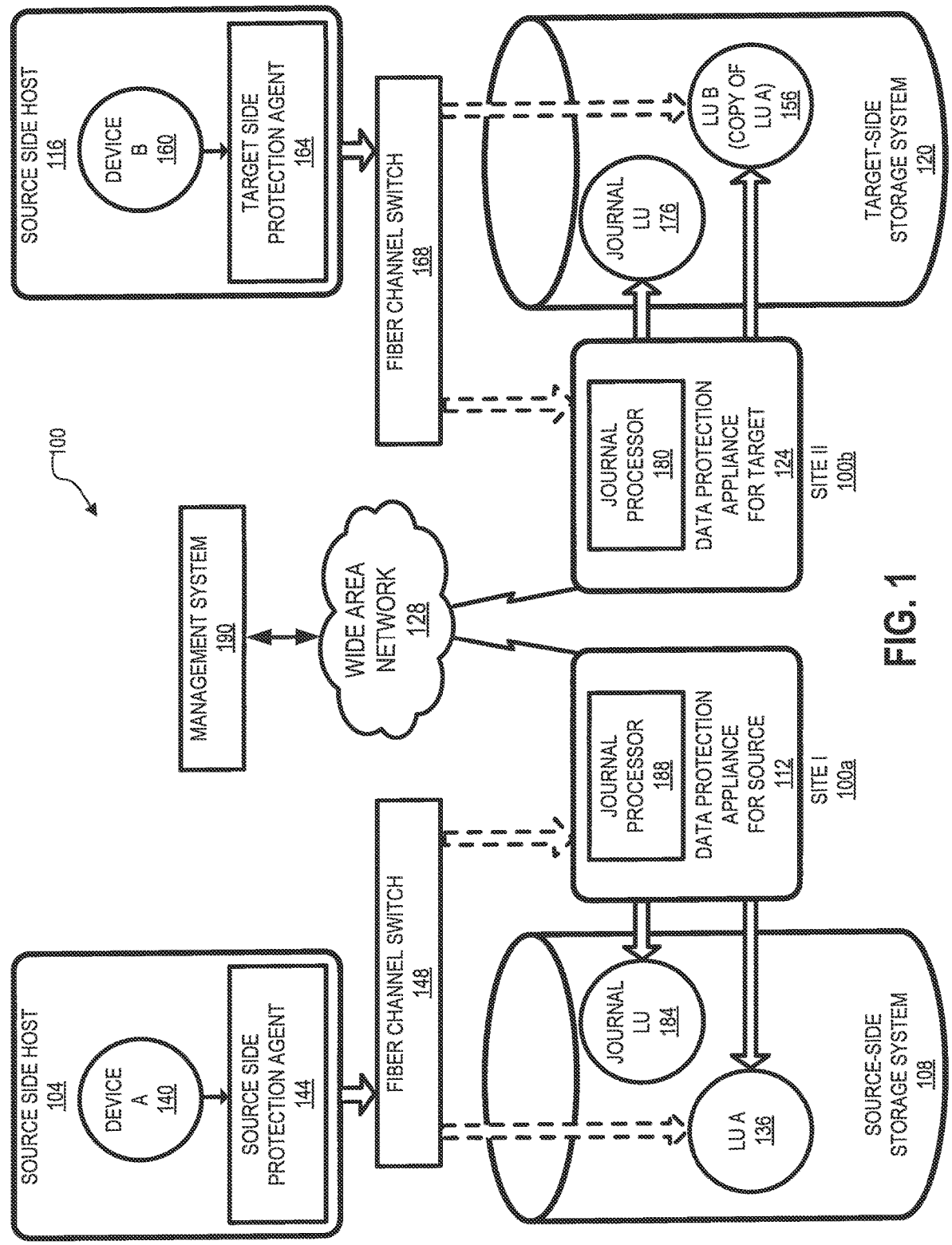
FIG. 1 is a diagram of an example of a distributed storage system, according to aspects of the disclosure.

Referring to the embodiment of FIG. 1, a data protection system 100 includes two sites: Site I 100*a* and Site II 100*b*. Under normal operation Site I 100*a* may correspond to a source side (i.e., the transmitter within a data replication workflow) of system 100 and Site II 100b may be the target side (i.e., the receiver within a data replication workflow) of the system, as shown in FIG. 1. Thus, during normal operations, the direction of replicate data flow may go from Site I 100a to Site II 100b.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN) 128, such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU is a physical or virtual logical entity provided by a storage system for accessing data stored therein. In some embodiments, an LU may be a virtual disk accessed by a virtual machine. In certain embodiments, an LU may be identified by a unique logical unit number (LUN).

In the embodiment of FIG. 1, storage system 10$ exposes a logical unit 136, designated as LU A, and storage system 120 exposes a logical unit 136, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access an LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 156 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. Alternatively, a protection agent may also be located in a fiber channel switch, or in any other device situated in a data path between a host and a storage system or on the storage system itself. In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." A journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 may be configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network-based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

In some implementations, the storage system may include a management system 190 that is configured to receive log messages that are generated in different nodes in the storage system 100 and aggregate those messages for further processing. By way of example, the processing of the messages may include one or more of: outputting the aggregated log messages on a display screen, generating data based on the aggregated log messages, and displaying the log data on a display screen (or another type of output device), transmitting the aggregated log messages to a remote device, changing the state of the distributed storage system, and or any other suitable system.

Figure 2:
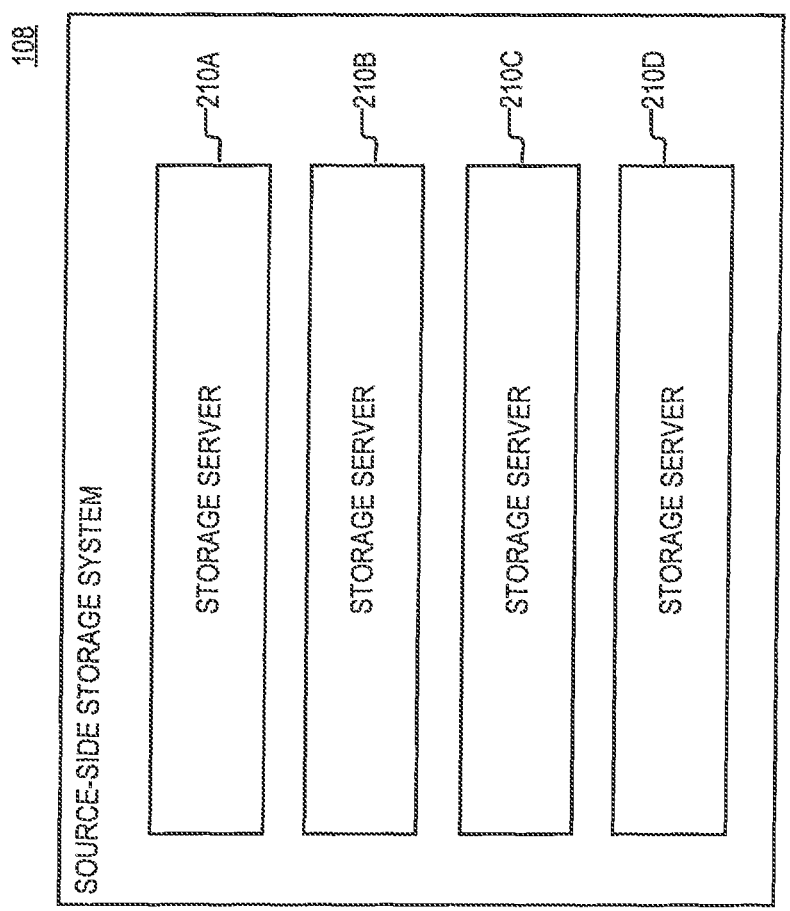
FIG. 2 is a diagram of an example of a source side storage system that is part of the distributed storage system of FIG. 1, according to aspects of the disclosure.

FIG. 2 is a diagram of the storage system 108 of the storage system 100, according to aspects of the disclosure. The storage system 108 may include a plurality of storage servers 210 that are coupled to one another in a network (e.g., a mesh network). The network may include an infiniBand network, a TCP/IP network, and/or any other suitable type of network. As is discussed further below, each of the storage servers 210 may be configured to execute one or more I/O service processes, which are sometimes also referred as TRUCK processes. As is further discussed below, each I/O service process may include any suitable type of process that is configured to execute (either partially or fully) incoming I/O requests, as well as perform additional operations related to data storage and retrieval.

Figure 3:
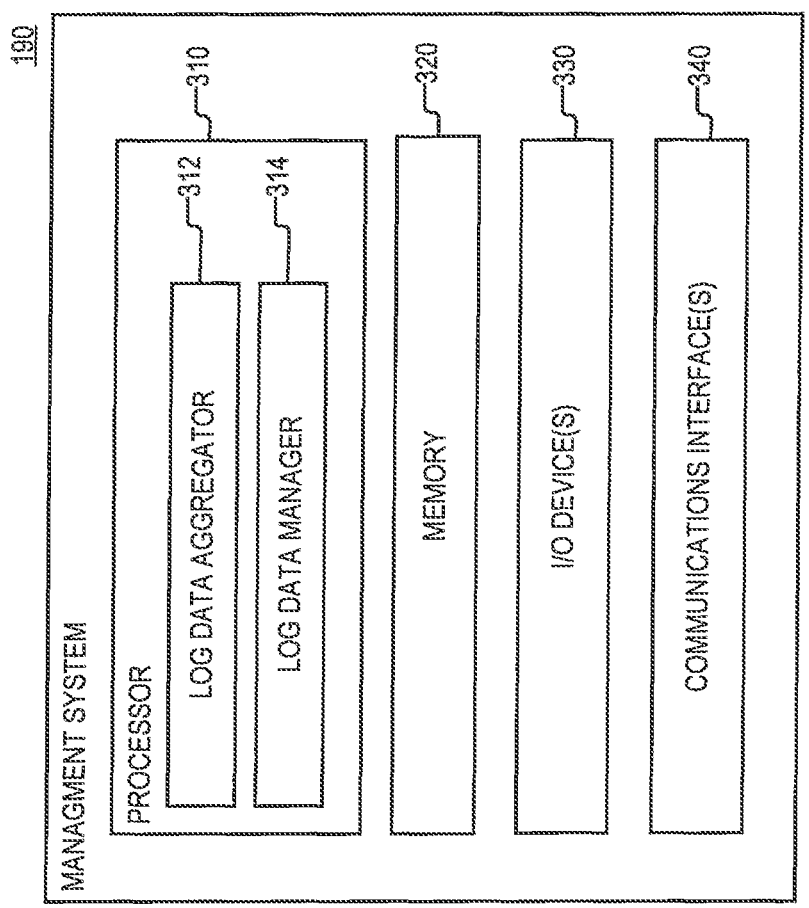
FIG. 3 is a diagram of an example of a management system that is part of the source side storage system of FIG. 2, according to aspects of the disclosure.

FIG. 3 is a diagram of an example of the management system 190, according to aspects of the disclosure. As illustrated, the management system 190 may include one or more processors 310, a memory 320, I/O device(s) 330, and communications interface(s) 340 that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HT)), a solid-state drive (SSD), a network accessible storage (NAS), and or any other suitable type of memory device. The I/O device(s) 330 may include any suitable type of input and/or output device, such as one or more mice, one or more keyboards, one or more microphones, or one more display screens, for example. The communications interface(s) 340 may include any suitable type of communications interface, such as one or more Ethernet adapters, one or more Wi-Fi adapters (e.g., 802.1414 adapters), and one or more Long-Term Evolution (LTE) adapters, for example. Although in the example of FIG. 3, the management system 190 is depicted as a monolithic device, it will be understood that alternative implementations are possible in which the management system is implemented as a distributed system comprising a plurality of computing devices that are coupled to one another via a communications network.

As illustrated in FIG. 3, the management system 190 may be configured to execute the log data aggregator 312 and a log data manager 314. The log data aggregator 312 may include one or more processor-executable instructions, which when executed by the processor 310, cause the processor 310 to aggregate log messages generated in different nodes of the computing system 100 and provide the aggregated messages to the log data manager 314. In some implementations, the log data aggregator 312 may be configured to perform a process 900, which is discussed further below with respect to FIG. 9. Although in the present example, the log data aggregator 312 is implemented in software, it will be understood that alternative implementations are possible in which the log data aggregator 312 is implemented in hardware or as a combination of hardware and software.

The log data manager 314 may include one or more processor-executable instructions, which when executed by the processor 310, cause the processor 310 to perform an action based on aggregated messages that are received from the log data aggregator 312. In some implementations, the action may include displaying the aggregated log messages. Additionally or alternatively, the action may include displaying an alert or sounding an alarm sound based on one or more of the aggregated messages. Additionally or alternatively, in some implementations, the action may include generating data (e.g., a graph) based on one or more aggregated messages and displaying the data. Additionally or alternatively, in some implementations, the action may include transmitting the aggregated messages (or data that is generated based on the aggregated messages) to a remote device (e.g., a developer terminal). Additionally or alternatively, in some implementations, the action may include changing a state of the distributed storage system, such as instantiating one or more I/O providers (shown in FIG. 5) when the aggregated messages indicated that the system's latency has exceeded a threshold, or terminating the execution of one or more I/O providers when the aggregated messages indicate that the latency of the system has fallen below a threshold. Although in the present example, the log data manager 314 is implemented in software, it will be understood that alternative implementations are possible in which the log data manager 314 is implemented in hardware or as a combination of hardware and software.

Although in the present example the log data aggregator 312 and the log data manager 314 are depicted as separate entities, it will be understood that in some implementations they may be integrated together in the same body of code (e.g., in the same process or thread). Although in the present example, the log data aggregator 312 and the log data manager 314 are implemented (e.g., executed) on the same computing device, it will be understood that alternative implementations are possible in which the log data aggregator 312 and the log data manager 314 are executed on different computing devices.

Figure 4:
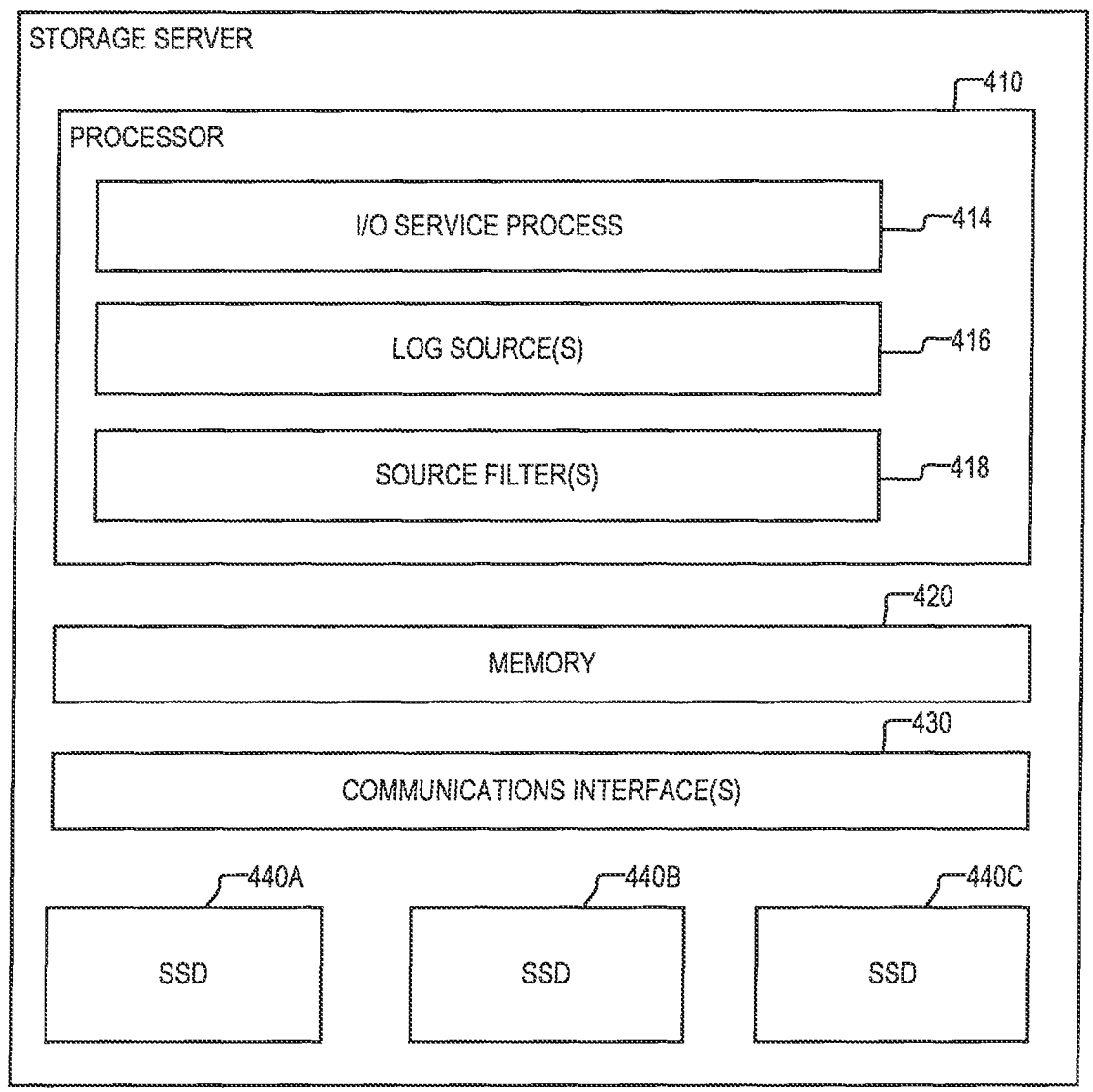
FIG. 4 is a diagram of an example of a storage server that is part of the source side storage system of FIG. 2, according to aspects of the disclosure.

FIG. 4 is a diagram of an example of the storage server 210, which as the numbering suggests is representative of any of the storage servers 210A-D in the storage system 108. As illustrated, the storage server 210 may include a processor 410, a memory 420, a communications interface(s) 430, and a plurality of storage devices that are operatively coupled to one another. The processor 410 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 420 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 430 may include any suitable type of communications interface, such as one or more Ethernet adapters, one or more Wi-Fi adapters (e.g., 802.1414 adapters), and one or more Long-Term Evolution (LTE) adapters, for example. The storage devices 440 may be configured to form at least a portion of the LU 108. In the present example, the storage devices 440 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

Figure 5:
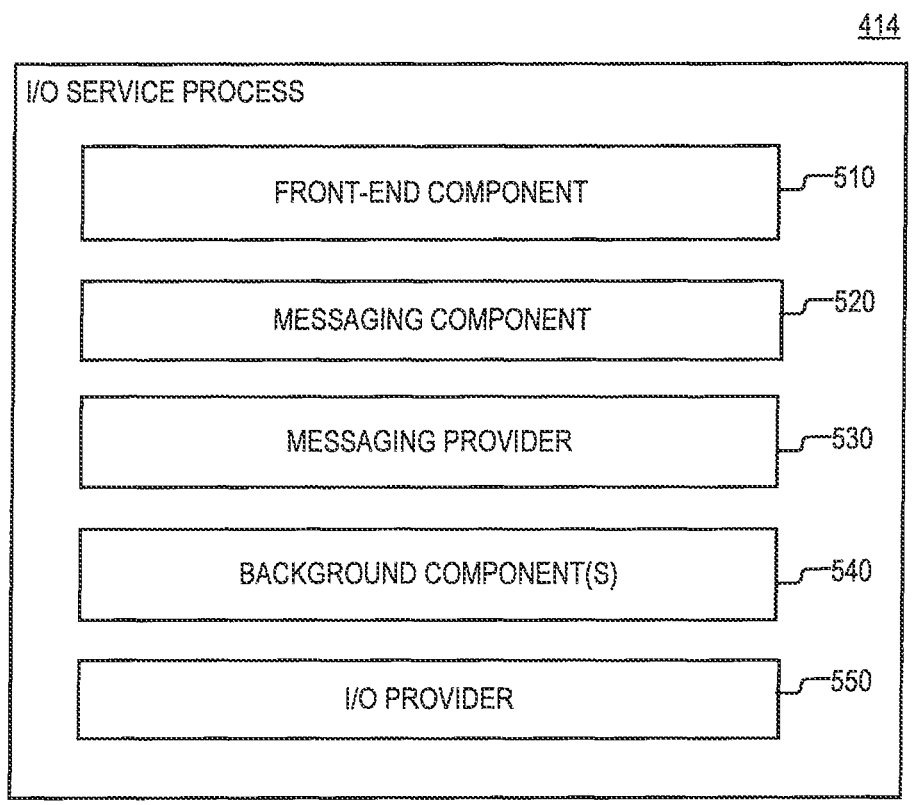
FIG. 5 is a diagram of an I/O service process that is executed by the storage server of FIG. 4, according to aspects of the disclosure.

According to the present example, the processor 410 may be configured to execute at least one I/O service process 414, an example of which is shown in FIG. 5. Furthermore, in some implementations, the processor 410 may be configured to execute one or more log sources 416 and one or more log filters 418. Each log source 416 may include one or more processor executable instructions that are configured to generate log messages associated with a particular resource. The messages may be generated for various purposes, such as monitoring or debugging, for example. In some implementations, a given one of the log sources 416 may generate log messages associated with a specific hardware resource of the storage server 210, such as the processor 410, the memory 420, the communications interface 430, or the storage devices 440. In such instances, any log message that is generated by the given log source 416 may include an indication of a metric associated with the operation of the hardware resource (e.g., utilization rate, latency, throughput, etc.) and a timestamp indicating when the log message is generated.

Additionally or alternatively, in some implementations, a given one of the log sources 416 may be associated with any software resource of the storage server 210. Examples software resources which can be monitored by the given log source 416 include the frontend component 510, the messaging component 520, the messaging provider 530, any of the background component(s) 540, and the I/O provider(s) 550, which are shown in FIG. 5. In such instances, any log message that is generated by the given log source 416 may include an indication of a metric associated with the operation of the software resource (e.g., rate at which I/O requests or other instructions are supplied to a particular I/O provider, latency at which the I/O requests or other instructions are serviced by the particular I/O provider, etc.) and a timestamp indicating when the log message is generated.

It will be understood that the present disclosure is not limited to any specific type of data that is collected by any of the log sources 416 and/or any specific implementation of any of the log sources. For example, some of the log sources 416 may be implemented as separate processes or threads, while others may be integrated into processes or threads that perform other functions. Although in the present example the log sources 416 are implemented in software, further implementations are possible in which any of the log sources 416 is implemented in hardware or as a combination of software and hardware.

In some implementations, any of the log sources 416 may be either an infinite log source or a finite log source. A log source that is "infinite" may produce log messages continuously until the log source is terminated as a result of an external event (e.g., an interrupt, etc.), whereas a log source that is "finite" may be a log source that is programmed (or designed) to stop generating log messages at a certain point in time. In operation, any of the log source messages to a respective one of the log filters 418 for further processing. Each of the log filters 418 may be configured to receive log messages from one of the log sources 416 and process the messages, as discussed further below with respect to FIG. 8. Although in the present example the log filters 418 are implemented in software, further implementations are possible in which any of the log filters 418 is implemented in hardware or as a combination of software and hardware.

FIG. 5 is a diagram of the I/O service process 414, which is executed on the processor 410 of the storage server 210A. As illustrated, the I/O service process 414 may include a frontend component 510, a messaging component 520, the messaging provider 530, the background component(s) 540, and I/O provider(s) 550. The frontend component 510 may be configured to pull I/O requests from the 110 pool 312 for execution by the I/O provider(s) 550. The messaging component 520 may include any suitable type of software component that is configured to send and receive messages from storage servers 210, other than the storage server on which the messaging component 520 is executed. The messaging provider 530 may be configured to poll the messaging component 520 for received messages and/or process the received messages. The background component(s) 540 may include one or more components configured to perform background functions that are normally found in storage systems, such as defragmentation, and RAID rebuild, etc.

The I/O provider(s) 550 may include one or more I/O providers that are executed on the processor 410, Each of the I/O providers may be configured execute incoming I/O requests that incident on the storage system 100, the storage server 210A, and/or the I/O service process 414. In some implementations, each I/O provider may be arranged to execute incoming I/O requests fully. Alternatively, in some implementations, each I/O provider may be configured to partially execute an I/O request by implementing a particular stage of an I/O request fulfillment pipeline. Stated succinctly, the present disclosure is not limited to any specific implementation of the 10 provider(s) 550.

In the present example, each of the frontend component 510, the messaging component 520, the messaging provider 530, the background components(s) 540, and the I/O provider(s) 550 is implemented as a separate thread that is instantiated by and executed within the user space of the I/O service process 414. However, alternative implementations are possible in which any of the frontend component 510, the messaging component 520, the messaging provider 530, the background component(s) 540, and the I/O provider(s) 550 is executed outside of the user space of the I/O service process 414. For the purposes of the present disclosure, the terms "process" and "thread" may be used interchangeably to refer to a sequence of processor-executable instructions that can be managed independently by a scheduler that is part of an operating system and/or another type of scheduler that is itself managed by the operating system scheduler.

Figure 6:
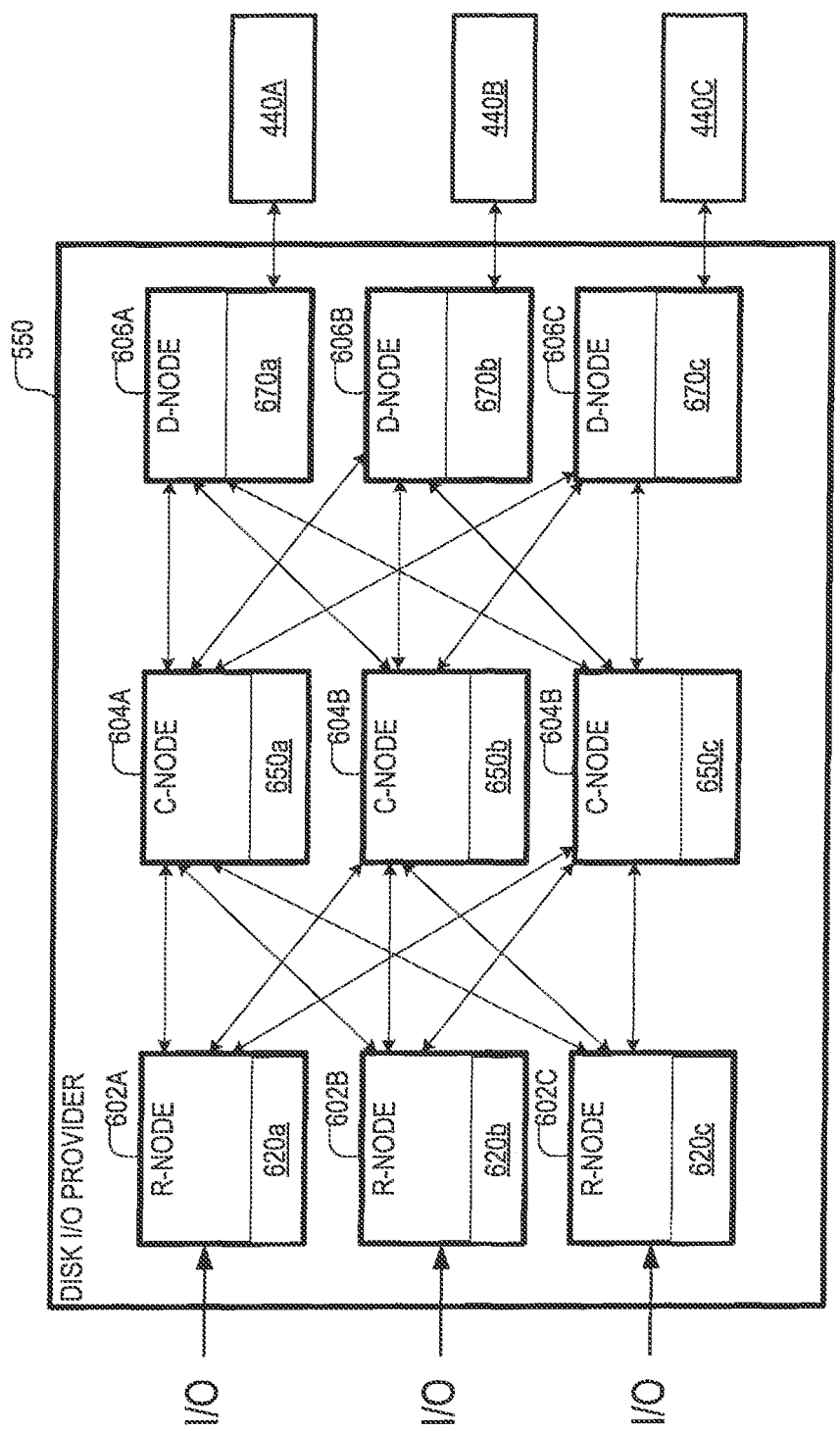
FIG. 6 is a diagram of an example of a disk I/O provider that is executed within the I/O service process of FIG. 5, according to aspects of the disclosure.

FIG. 6 is a diagram illustrating an example of one particular implementation of the I/O provider(s) 550. According to the present example, the I/O provider(s) 550 includes I/O providers 602, 604, and 606, which are herein referred to as routing nodes, control nodes, and data nodes respectively.

The routing nodes 602 may be configured to terminate I/O requests received at the storage system 100 and route them to appropriate control nodes 604 and data nodes 606 for further execution, In doing so, the routing nodes 602 may distribute a workload over multiple control nodes 604 and data nodes 606. In some implementations, any of the routing nodes 602 may be configured to write I/O requests SCSI I/O requests) to selected ones of the control nodes 604 for further processing. In some implementations, each of the routing nodes 602 may be provided with a respective address-to-control-module (A2C) table 620 that identifies a plurality of control nodes (e.g., the control nodes 604) and a different respective LDA range that is managed by each of the control nodes. In this regard, the A2C table 620 may define a plurality of logical spaces that are managed by different control nodes 604. In the present example, a copy of the A2C table 620 is stored on each of the routing nodes 602. However, it will be understood that the present disclosure is not limited to any specific method for allocating respective logical spaces to the control nodes 604.

The control nodes 604 may be configured to control the execution of control node commands supplied by the routing nodes 602. The control node commands may be used to implement read requests, write requests, and/or any other suitable I/O request. In addition, each of the control nodes 604 may maintain and manage key metadata elements. Each of the control nodes 604 may be configured to receive control node commands from the routing nodes and communicate with the data nodes 606 to execute the commands. In some implementations, each control node 604 may maintain an address-to-data node table (H2D) table 650 that identifies a plurality of data nodes and a different respective hash digest range that is associated with each of the data nodes. In this regard, the H2D table may effectively define a plurality of logical spaces that are managed by different data nodes 606. In the present example, a copy of the H2D table is stored on each of the control nodes 604.

The data nodes 606 may be configured to control the execution of data node commands supplied by the control nodes 604. Each of the data nodes 606 may be attached to one or more of the storage devices 440. Each of the data nodes may store in memory a hash-to-physical-address (H2P) table 670. The H2P table 670 may identify a plurality of physical addresses in the storage devices 440, and different respective hash digest that is mapped to each of the physical addresses. In this regard, the H2P table 670 may be used to map hash digests received from the control nodes to different physical locations in the volumes 160 managed by the data nodes 606. In the present example, each of the data nodes 606 includes a different table H2P table 670 that is specific to that data node.

In operation, any of the routing nodes 602 may receive an I/O request that spans a range of logical data addresses (LDAs) from the multipath agent 608. The request may include a block of data and an opcode identifying an action that is required to be performed. In response to the request, the routing node 602 may use its respective A2C table to identify a plurality of control nodes 604 based on the A2C table. Afterwards, the routing node 602 may decompose the I/O request into a plurality of control node commands and forward the control node commands to the identified control nodes 604 for further processing.

In operation, any of the control nodes 604 may receive a control node command that is generated by one of the routing nodes 602. The control node command may include a data payload and an opcode identifying an action that is required to be performed. Upon receiving the control node command, the control node 604 may decompose the control node command into a plurality of data node commands and forward each of the data node commands. In some implementations, each of the data node commands may include a different page of data along with a hash digest of the page. Each data node command may then be forwarded to a respective data node 606 that is selected based on the H2D table 650 and the data node command's hash digest (i.e., the data node responsible for managing the range of hash digests which the data node command's respective hash digest falls into).

In operation, any of the data nodes 606 may receive a data node command that is generated by one of the control nodes 604. Next, the data node 606 may search its respective H2P table to identify a physical address in one of the storage devices 440 that corresponds to the hash digest that is contained in the data node command. Afterwards, the data node 606 may store the payload of the data node command (i.e., the page of data contained in the data node command) at the identified physical address.

Figure 7A:
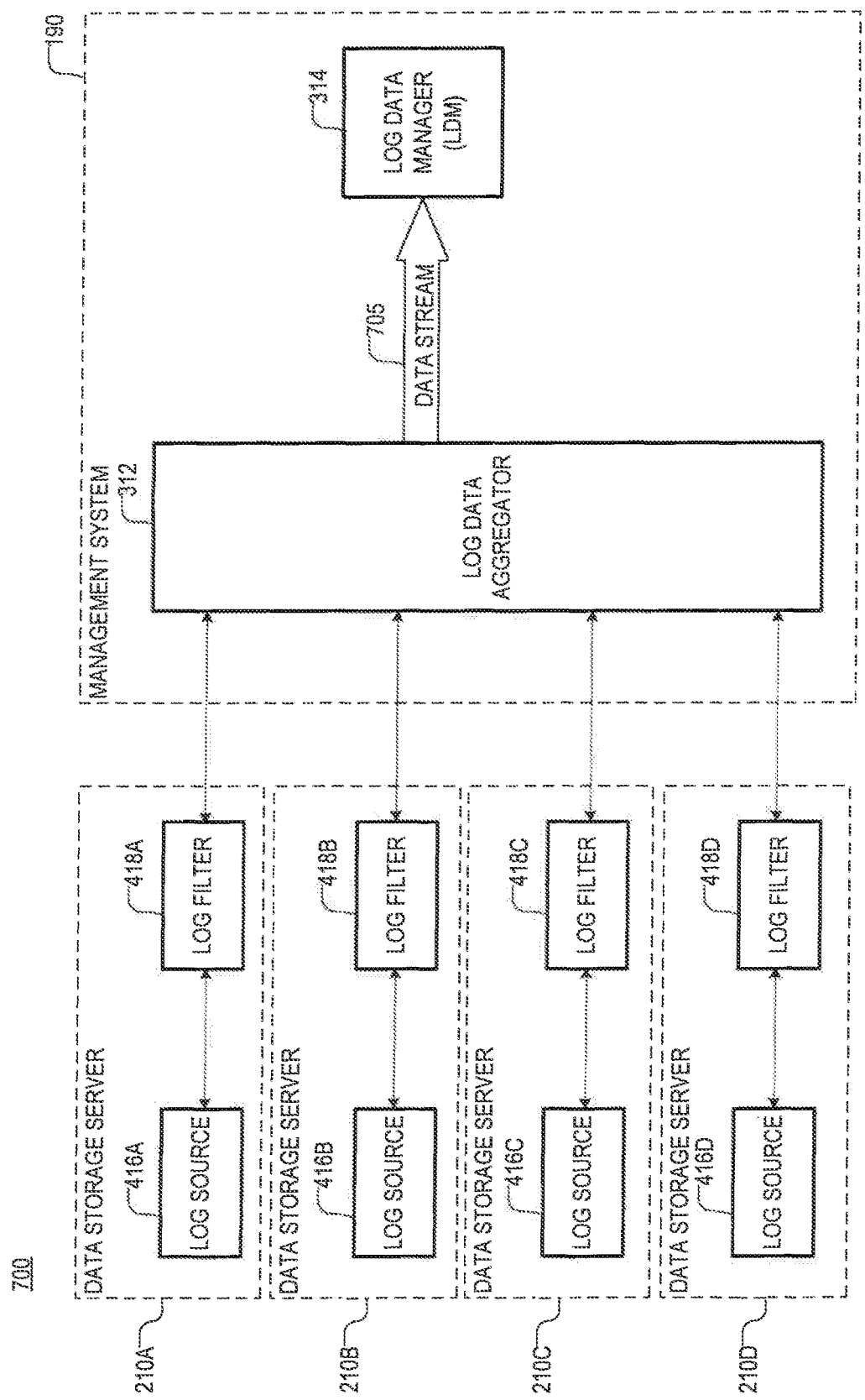
FIG. 7A is a diagram of an example of a logging layer of the distributed storage system of FIG. 1, according to aspects of the disclosure.

FIG. 7A is a diagram of an example of a logging layer 700 of the storage data system 100, according to aspects of the disclosure. As illustrated, the logging layer 700 may have a distributed architecture in which messages generated by log sources 416 at different nodes in the storage system 100 are routed to the log data aggregator 312 via a plurality of log filters 418. The log data aggregator 312 may process any log messages that are received from the log filters 418 to produce a set of aggregated messages, which is written to a data stream 705 to be delivered to the log data manager 314.

In one aspect, each of the log filters 418 may be configured to generate placeholder messages, when the log filter's 418 respective log source 416 is in a paused state. For example, if a log filter 418 is requested to provide a log message, but the log filter's constituent log source 416 is unavailable or has otherwise failed to produce a new message in a timely fashion, the log filter may generate a placeholder message, and provide the placeholder message to the log data aggregator 312. The placeholder message may be provided instead of an actual log message that is generated by one of the log sources 416. Providing the placeholder message instead of an actual log message may prevent a situation in which the log data aggregator is held back as a result of jitter (or other disruptions) in the rate at which messages are delivered by a log source 416 to the log source's 416 associated log filter 418, thereby allowing the log data aggregator 312 poll log filters at a speed that is sufficient to collect respective log messages in the order in which they are generated. This in turn permits the log data aggregator 312 to also provide the log messages to the log data manager 314, which in turn permits the log data aggregator to display (or otherwise process) the log messages in the order in which they are generated, One advantage of this arrangement is that, in some implementations, the display (or other processing) may be performed in real-time or near-real-time, thereby allowing systems administrators to have a complete and up-to-date view of the state of the storage system 100.

In the present example, the log sources 416 and the log filters 418 are executed on different storage servers 210 of the storage system 100. More particularly, the log source 416A and the log filter 418A are executed on the storage server 210A, and the log source 416A is configured to supply log messages that are generated by it to the log filter 418A; the log source 41613 and the log filter 418B are executed on the storage server 210B, and the log source 416B is configured to supply log messages that are generated by it to the log filter 418B; the log source 416C and the log filter 418C are executed on the storage server 210C, and the log source 416C is configured to supply log messages that are generated by it to the log filter 418C; and the log source 416D and the log filter 418D are executed on the storage server 210D, and the log source 416D is configured to supply log messages that are generated by it to the log filter 418D. Although in the present example each log source 416 is configured to feed log messages to a log filter 418 that is executed on the same computing device as the log source 416, alternative implementations are possible in which any of the log sources 416 is configured to supply log messages to a log filter 418 that is executed on a different computing device. Furthermore, although in the present example, each of the log sources 416 is configured to provide log messages to only one log filter 418, alternative implementations are possible in which any log message that is generated by a given log filter is provided to multiple log filters 418. Although in the example of FIG. 7A the log sources 416 are depicted as being executed on the data storage servers, it will be understood that alternative implementations are possible in which one or more of the log sources 416 are executed on another type of node of the storage system 100.

Figure 7B:
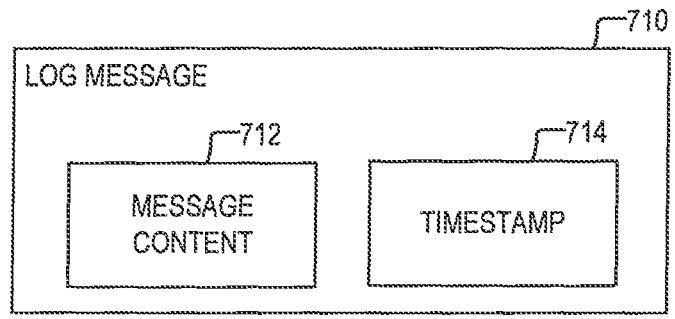
FIG. 7B is a diagram of an example of a log message, according to aspects of the disclosure.

Shown in FIG. 7B is an example of a log message 710, according to aspects of the disclosure. As illustrated, the log message 710 may include a message content 712 and a timestamp 714. According to the example of FIG. 7B, the log message 710 is generated by the log source 416A. However, it will be understood that any of the log sources 416 in the storage system 100 may be configured to generated log messages that have the same or similar structure. As illustrated in FIG. 7B, the log message 710 may include a message content 712 and a timestamp 714. The message content 712 may include an indication of an operational metric of a hardware or software resource of a node of the distributed storage system 100. The timestamp 714 may include an indication of the time when the log message 710 and/or the message content 712 is generated.

Figure 7C:
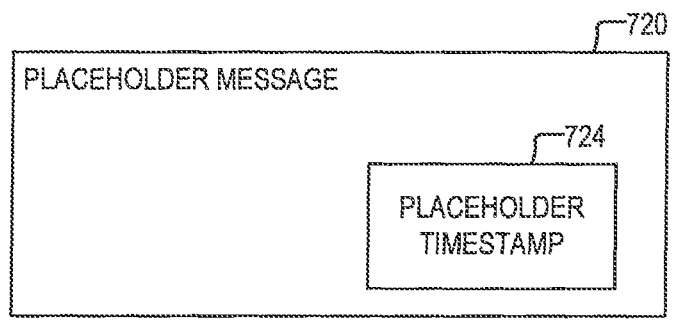
FIG. 7C is a diagram of an example of a placeholder message, according to aspects of the disclosure.
Figure 7D:
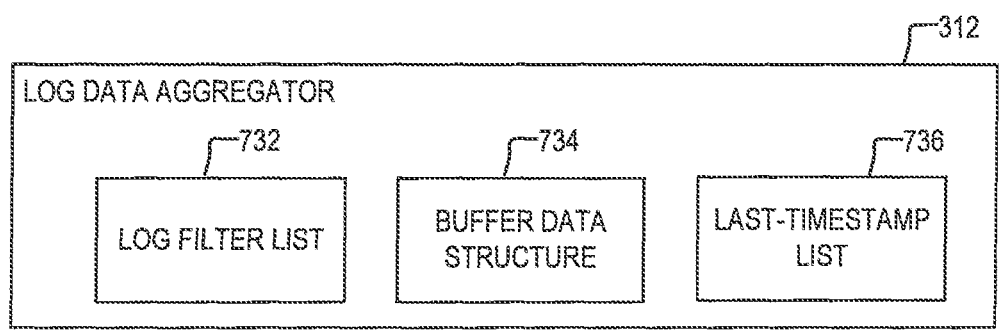
FIG. 7D is a diagram illustrating a set of data structures that are utilized by a log filter, according to aspects of the disclosure.

Shown in FIG. 7C is an example of a placeholder message 720, according to aspects of the disclosure. According to the example of FIG. 7C, the placeholder message 720 is generated by the log filter 418A when the log source 416A is in a paused state. However, it will be understood that the placeholder messages generated by any log filter 418 in the storage system may have the same or similar structure. As illustrated in FIG. 7C, the placeholder message 720 may include a placeholder timestamp 724. In some implementations, the placeholder timestamp 724 may be equal to the timestamp of a message generated by the log source 710, which has been previously processed by the log filter 710A.

Shown in FIG. 7C, are several data structures that are stored in the memory 320 of the management system 190, and which are utilized by the log data aggregator 312 over the course of its operation. As illustrated in FIG. 7, the data structures include a log filter list 732, a buffer data structure 734, and a last-timestamp list 736.

The log filter list 732 may include a plurality of identifiers of log filters 418, which log data aggregator is arranged to interact with. As used throughout the disclosure, the term "log filter list" may refer to any collection of log filter identifiers, irrespective of how the collection is implemented. In some implementations, a log filter list may be implemented as a file or a data structure. Additionally or alternatively, in some implementations a log filter list may be implemented as a plurality of files or data structures. In some implementations, a log filter list may be stored in its entirety on the same storage device, while in other implementations, the log filter list may be distributed across different storage devices.

The buffer data structure 734 may include a Min-Heap data structure, a stack, a file system directory, and/or any other suitable type of the data structure or set of data structures where received log messages 710 can be stored before being removed for further processing by the log data aggregator 312. Although in the present example the data structure 734 is a sort data structure, alternative implementations are possible in which the data structure 734 is another type of data structure. In some implementations, a log message may be considered to be stored in a data structure if the log message is stored within the memory space of the data structure. Additionally or alternatively, in some implementations, a log message may be considered to be stored in a data structure if the log message is referenced by one or more identifiers that are part of (or otherwise associated with) the data structure.

The last-timestamp list 736 may include the timestamps of one or more previously-processed log messages. For example, in some implementations, the last-timestamp list may include indications of the timestamps of one log messages that have been stored in the data structure 734 and subsequently removed from the data structure 734 by the log data aggregator 314. The present disclosure is not limited to any specific implementations of the last-timestamp list 732. For example, in some implementations, the last-timestamp list may be implemented as an integer or integer array.

Figure 8:
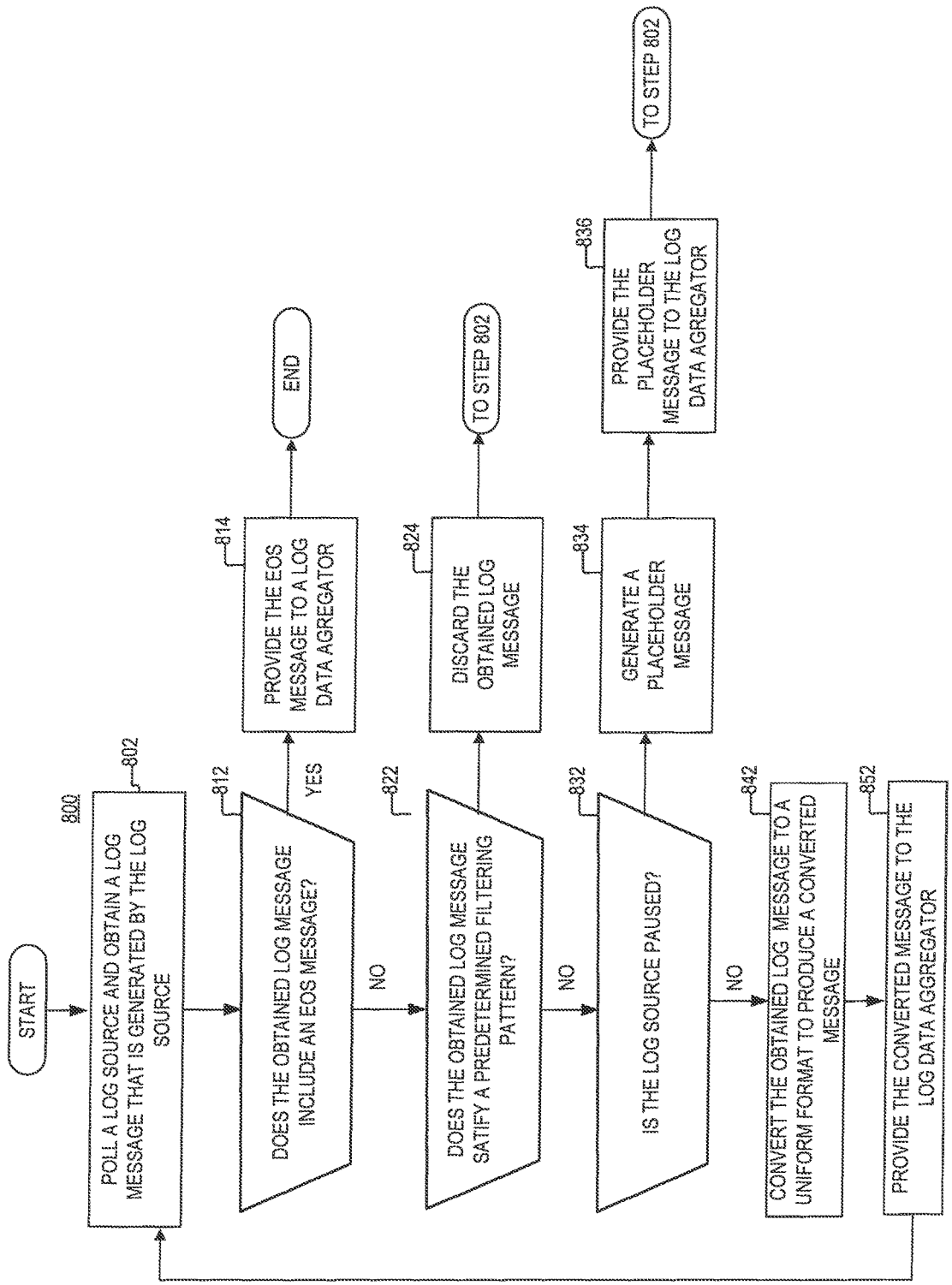
FIG. 8 is a flowchart of an example of a process, according to aspects of the disclosure.

FIG. 8 is a diagram of an example of a process 800, according to aspects of the disclosure. For illustrative purposes, the process 800 is described as being performed by the log filter 418A. However, it will be understood that any other log filter 418A in the storage system 100 can be configured to perform the same or similar process.

At step 802, the log filter 418A polls the log source 416A and obtains a log message as a result. The log message may be one of: (i) a regular log message, such as the log message 710, which is discussed with respect to FIG. 7B, an end-of-stream message (EOS) which is generated when the log source 416A completes its execution, or an error message indicating that log source 418A has experienced a failure or otherwise become unavailable. As used throughout the disclosure, the term "poll" may refer to any suitable action that results in the log filter 418A obtaining a log message from the log source 416A, such as transmitting a request to the log source 416A or accessing a log file that is being populated by the log source 416A.

At step 812, the log filter 418A detects whether the obtained log message includes an EOS-log message. If the obtained log message includes an EOS log message, the process 800 proceeds to step 814. Otherwise, if the obtained log message does not include an EOS log message, the process 800 proceeds to step 822. At step 814, the obtained log message is provided to the log data aggregator 312 and the process 800 is terminated.

At step 822, the log filter 418A detects whether the obtained log message matches of a filter pattern of the log filter 418A. If the filter pattern is satisfied, the process proceeds to step 824. Otherwise, if the filter pattern is not satisfied, the process proceeds to step 832. According to aspects of the disclosure, the filter pattern may include any suitable definition of a filtering criterion which determines whether a message is discarded (or blocked) by the log filter 418 or let through and propagated to the log data aggregator 312. In some implementations, the filter pattern may be implemented using a regular expression or any other suitable type of expression. At step 824, when the obtained log message does not match the filter pattern of the log filter 418A, the obtained log message is discarded. In some implementations, discarding the log message may include one or more of deleting the obtained message, causing the log message (e.g., by action or inaction) to be collected by a garbage collector, or performing any other action that is different from the action discussed with respect to step 852.

At step 832, the log filter 418A determines if the log source 416A is paused. If the log source 416 is in a paused state, the process 800 proceeds to step 834. Otherwise, if the log source is not in a paused state, the process proceeds to step 836.

According to aspects of the disclosure, the log filter 418A may be in a paused state when the log data filter has stopped producing log messages and/or when the log data filter 418A has stopped producing log messages that match the filter pattern of the log filter 418A. More particularly, in some implementations, detecting whether the log source 816 is in a paused state may include one or more of detecting:

a. whether the log source 416 has not generated new messages for a first period of time (e.g., 20 ms);

b. whether the log source 416 has not generated log messages that match the filter pattern of the log filter 418A for a second period of time. In some implementations, the second period of time may be equal to the first period of time. Alternatively, in some implementations, the second period of time may be longer or shorter than the first period of time; and/or c. whether the log source 416 has generated an error message. For example, the error message may be one that indicates that: (i) the log source 416 is experiencing network problems (e.g., low network bandwidth or no network availability at all), (ii) the log source 416 has crashed, (iii) the log source 416 is restarting, or (iv) that the node on which the log source 416 is executed has experienced a failure and is undergoing recovery.

At step 834, when the log source 416 is in a paused state, the log filter 418A generates a placeholder message on behalf of the log source 416. As noted above, the placeholder message may be a log message that has a timestamp that is equal to the time stamp of a given message that has been previously obtained from the log source. In some implementations, the given message may be the last message generated (and/or obtained) from the log source 416. Additionally or alternatively, in some implementations, the given message may be the last message that has been generated by the log source 416, which matches the filter pattern of the log filter 418A. As is discussed further below, setting the timestamp of the placeholder message would cause the placeholder message to be out of order with messages in the data structure 734 of the log data aggregator 312, which in turn would allow the log data aggregator to distinguish the placeholder message from other log messages that are being processed. After step 834 is completed, the process 800 returns to step 802.

At step 842, the log filter 418A converts the obtained log message to a uniform format to produce a converted log message. In sonic implementations, the uniform format may be a format that is shared among all messages that are received at the log data aggregator 312.

At step 852, the log filter 418A provides the converted log message to the log data aggregator 312. In some implementations, providing the converted log message may include transmitting the converted message, over a communications network, to the log data aggregator 312. Additionally or alternatively, in some implementations, providing the converted log message may include storing the converted log message into a memory that is shared among the log filter 418 and the log data aggregator. Additionally or alternatively, in some implementations, providing the log message may include writing the log message to a data stream.

Although in the example of FIG. 8 the log filter 418A uses the obtained log message to determine whether the log source 416A is in a paused state, alternative implementations are possible in which the log filter 418A is unable to obtain the log message at all due to the log source 416A being unresponsive or for another reason. In such instances, when the log filter 418A attempts and fails to obtain a log message from the log source 416A, the log filter 418A may automatically determine that the log source 416A is in a paused state, without executing steps 812 and 822 first.

Figure 9:
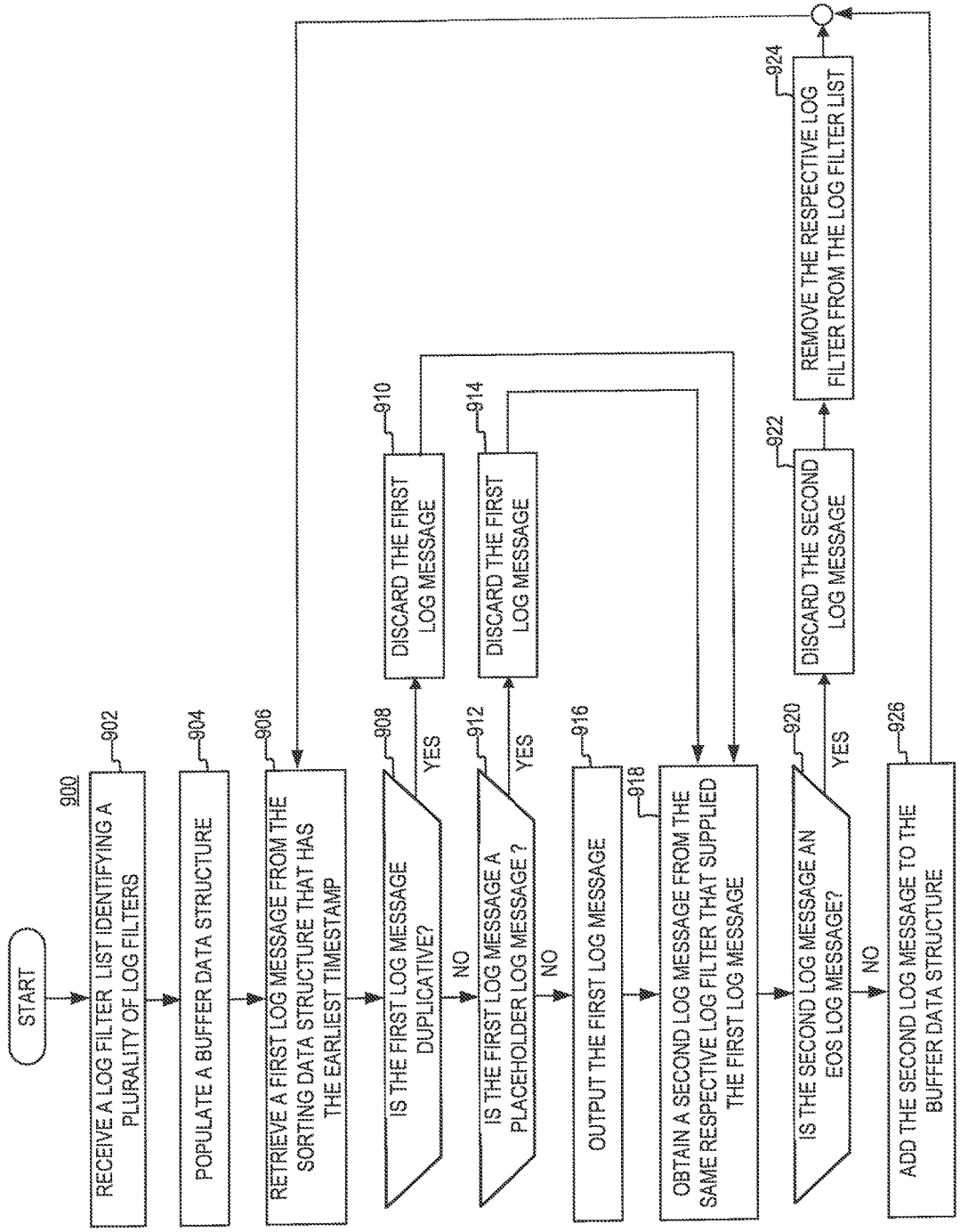
FIG. 9 is a flowchart of an example of a process, according to aspects of the disclosure.

FIG. 9 is a flowchart of an example of a process 900 that is performed by the log data aggregator 312, according to aspects of the disclosure.

At step 902, the log filter list 732 is stored in the memory 320 of the management system 190. As discussed above, the log filter list 732 identifies a plurality of log filters 418 which the log data aggregator 312 is configured to receive log messages from. In some implementations, the log filter list 732 may be provided to the management system 190 and/or the log data aggregator 312 as user input, prior to activating the log data aggregator 312.

At step 904, the data structure 734 is populated with messages obtained from the log filters 418 that are identified in the log filter list 732 and stored in the data structure 734. Populating the data structure 734 may include obtaining a predetermined number of log messages from each of the log filters 418 that are identified in the log filter list 732, and storing the log messages in the data structure 734. According to the present example, only one message is obtained from each of the log filters 418 that are identified in the log filter list 732. However, alternative implementations are possible in which two or more messages are obtained from each of the log filters 418 that are identified in the log filter list 732. According to the present example, the same number of messages is obtained from each of the log filters 418 that are identified in the log filter list 732. However, alternative implementations are possible in which different numbers of messages are obtained from at least two of the log filters 418 that are identified in the log filter list 732.

At step 906, a first log message having the least recent (e.g., smallest) timestamp among all messages in the data structure 734 is retrieved (e.g., popped) from the data structure 734. The least recent timestamp may be a timestamp that identifies the earliest time from among the timestamps of all other log messages in the data structure 734. In this regard, the first log message may be one that is generated before any other log message in the data structure 734. In instances in which more than one message in the data structure contains a "least recent" timestamp, any of those messages may be retrieved.

At step 908, a determination is made if the first log message is duplicative with another message that has been retrieved from the data structure 734 and subsequently processed. If the first log message is duplicative, the process 900 proceeds to step 910. Otherwise, if the first log message is not duplicative, the process 900 proceeds to step 918.

In some implementations, two messages are considered duplicative to one another if they are substantially identical. As can be readily appreciated, duplicative messages may arrive at the log data aggregator because: (i) multiple log filters 418 are configured to receive log messages from the same log source 416, and (ii) the same log message that is generated by the log source matches the filter patterns of at least two of the filters that have received it. In some implementations, the determination whether the retrieved message is duplicative may be made by using a list that identifies a set of previously-retrieved messages (e.g., the last five messages that are retrieved from the data structure 734) and determining whether the retrieved log message matches any of the log messages that are identified in the list. The present disclosure is not limited to any specific method for determining whether a message has already been processed once (i.e., whether a message is duplicative).

At step 910, the first log message is discarded. When the first log message is discarded, the first log message is not output for further processing at step 916. In some implementations, discarding the log message may include one or more of deleting the first log message, causing the log message (e.g., by action or inaction) to be collected by a garbage collector, and performing any other action that is different from the action discussed with respect to step 916.

At step 912, a determination is made if the first log message includes a placeholder message. If the first log message is placeholder message, the process 900 proceeds to step 914. Otherwise, if the first log message is not a placeholder message, the process 900 proceeds to step 918.

In some implementations, detecting whether the first log message includes a placeholder message may involve comparing the timestamp of the first log message to the timestamps in the last-timestamp list 736. If the timestamp of the received log message is less recent (e.g., smaller) than any of the timestamps in the last-timestamp list, a determination is made that the first log message includes a placeholder message. As discussed above, this determination may be reliably made based on timestamp comparison because the log filters 418 are configured provide log messages (e.g., either EOS messages, regular log messages, or placeholder log messages) at a steady pace that is unaffected by jitters in the operation of their constituent log sources 416, which in turn ensures that log messages that can be delivered from the log filters 418 to the log data aggregator 312 in the order in which they are generated. Thus, if the timestamp of the first log message appears to be out of order with the timestamps of other messages that have been processed before the first log message is received, a conclusion can be reliably drawn that the first log message is a placeholder message.

At step 914, the first log message is discarded. Step 914 may be performed in the same manner as step 910.

At step 916, the first log message is output for further processing. According to aspects of the disclosure, outputting the log message may include transmitting the first log message over a communications network to a remote computing device (e.g., a device executing a log data manager). Additionally or alternatively, outputting the first log message may include storing the log message into a predetermined location (e.g., a memory location that is accessible by the log data manager 314). Additionally or alternatively, outputting the first log message may include writing the first log message to a predetermined data stream.

At step 918, a second log message is obtained from the log filter 418 that is the source of the first log message.

At step 920, a determination is made if the second log message is an EOS message. If the first message is an EOS message, this is an indication that the log filter 418, which is the source of the first log message, has finished executing and the process 900 proceeds to step 922.

At step 922, the second log message is discarded. In some implementations, step 922 may be performed in the same manner as step 922. In some implementations, discarding the log message may include one or more of deleting the first log message, causing the log message (e.g., by action or inaction) to be collected by a garbage collector, and performing any other action that is different from the action discussed with respect to step 926.

At step 924, the identifier corresponding to the log filter 418, which is the source of the first and second log messages, is removed from the log filter list 732. After step 924 is completed, the process 900 returns to step 906.

At step 926, the second log message is stored in the data structure 734, which effectively results in the first log message being replaced with another log message that is obtained from the same log filter. After step 926 is completed, the process 900 returns to step 906.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for collecting log data in a distributed computing system, comprising:
   storing, in a memory of a first computing device, a log filter list that identifiers a plurality of log filters, each of the plurality of log filters being executed on a respective one of a plurality of nodes in the distributed computing system;
   removing a first log message from a data structure that is stored in the memory of the first computing device, the first log message being obtained by the first computing device from a first one of the plurality of log filters that is associated with a first log source, the first log message being removed from the data structure based on having a least recent timestamp among a plurality of log messages that are stored in the data structure;
   detecting whether the first log message includes a placeholder message that is generated by the first log filter while the first log source is in a paused state;
   discarding the first log message, when the first log message includes a placeholder message; and
   selecting the first log message for further processing, when the first log message does not include a placeholder message.

2. The method of claim 1, further comprising obtaining a second log message from the first log filter and including the second log message into the data structure to replace the first log message.

3. The method of claim 1, wherein detecting whether the first log message is a placeholder message includes detecting whether a first timestamp of the first log message is less than a second timestamp of a second log message that is removed from the data structure before the first log message.

4. The method of claim 1, wherein the data structure is configured to store no more than a predetermined number of log messages that are generated by any given one of the plurality of log filters.

5. The method of claim 1, further comprising:
   retrieving, by the first computing device, a second log message from the data structure, the second log message being obtained by the first computing device from a second one of the plurality of log filters, the second log filter being associated with a second log source;
   detecting, by the first computing device, whether the second log message includes an end-of-stream (EOS) message indicating that an execution of the second log source has been completed; and
   removing the second log filter from the log filter list when the second log message includes an EOS message.

6. The method of claim 1, wherein selecting the first log message for further processing includes at least one of writing the first log message to an output stream or storing the first log message in a predetermined location in the memory of the first computing device.

7. The method of claim 1, wherein selecting the first log message for further processing includes transmitting the first log message from the first computing device to a second computing device.

8. A system comprising:
a memory; and
at least one processor operatively coupled to the memory, the at least one processor being configured to:
store, in the memory, a log filter list that identifiers a plurality of log filters, each of the plurality of log filters being executed on a respective one of a plurality of nodes in a distributed computing system;
remove a first log message from a data structure that is stored in the memory, the first log message being obtained from a first one of the plurality of log filters that is associated with a first log source, the first log message being removed from the data structure based on having a least recent timestamp among a plurality of log messages that are stored in the data structure;
detect whether the first log message includes a placeholder message that is generated by the first log filter while the first log source is in a paused state;
discard the first log message, when the first log message includes a placeholder message; and
select the first log message for further processing, when the first log message does not include a placeholder message.

9. The system of claim 8, wherein the at least one processor is further configured to obtain a second log message from the first log filter and including the second log message into the data structure to replace the first log message.

10. The system of claim 8, wherein detecting whether the first log message is a placeholder message includes detecting whether a first timestamp of the first log message is less than a second timestamp of a second log message that is removed from the data structure before the first log message.

11. The system of claim 8, wherein the data structure is configured to store no more than a predetermined number of log messages that are generated by any given one of the plurality of log filters.

12. The system of claim 8, wherein the at least one processor is further configured to:
retrieve a second log message from the data structure, the second log message being obtained from a second one of the plurality of log filters, the second log filter being associated with a second log source;
detect whether the second log message includes an end-of-stream (EOS) message indicating that an execution of the second log source has been completed; and
remove the second log filter from the log filter list when the second log message includes an EOS message.

13. The system of claim 8, wherein selecting the first log message for further processing includes at least one of writing the first log message to an output stream or storing the first log message in a predetermined location in the memory.

14. The system of claim 8, wherein selecting the first log message for further processing includes transmitting the first log message a remote computing device.

15. A non-transitory computer-readable medium configured to store one or more processor-executable instructions, which when executed by at least one processor cause the at least one processor to perform the operations of:

storing, in a memory that is operatively coupled to the at least one processor, a log filter list that identifiers a plurality of log filters, each of the plurality of log filters being executed on a respective one of a plurality of nodes in a distributed computing system;

removing a first log message from a data structure that is stored in the memory, the first log message being obtained from a first one of the plurality of log filters that is associated with a first log source, the first log message being removed from the data structure based on having a least recent timestamp among a plurality of log messages that are stored in the data structure;

detecting whether the first log message includes a placeholder message that is generated by the first log filter while the first log source is in a paused state;

discarding the first log message, when the first log message includes a placeholder message; and selecting the first log message for further processing, when the first log message does not include a placeholder message.

16. The non-transitory computer-readable medium of claim 15, wherein the one or more processor-executable instructions, when executed by the at least one processor, further cause the at least one processor to obtain a second log message from the first log filter and including the second log message into the data structure to replace the first log message.

17. The non-transitory computer-readable medium of claim 15, wherein detecting whether the first log message is a placeholder message includes detecting whether a first timestamp of the first log message is less than a second timestamp of a second log message that is removed from the data structure before the first log message.

18. The non-transitory computer-readable medium of claim 15, wherein the data structure is configured to store no more than a predetermined number of log messages that are generated by any given one of the plurality of log filters.

19. The non-transitory computer-readable medium of claim 15, wherein the one or more processor-executable instructions, when executed by the at least one processor, further cause the at least one processor to perform the operations of:

retrieving a second log message from the data structure, the second log message being obtained from a second one of the plurality of log filters, the second log filter being associated with a second log source;

detecting whether the second log message includes an end-of-stream (EOS) message indicating that an execution of the second log source has been completed; and removing the second log filter from the log filter list when the second log message includes an EOS message.

20. The non-transitory computer-readable medium of claim 15, wherein selecting the first log message for further processing includes at least one of writing the first log message to an output stream or storing the first log message in a predetermined location in the memory.

\* \* \* \* \*